W. E. BOCK.
MACHINE FOR TRUING WORMS.
APPLICATION FILED MAY 11, 1914.
1,159,739.
Patented Nov. 9, 1915.
3 SHEETS—SHEET 1.
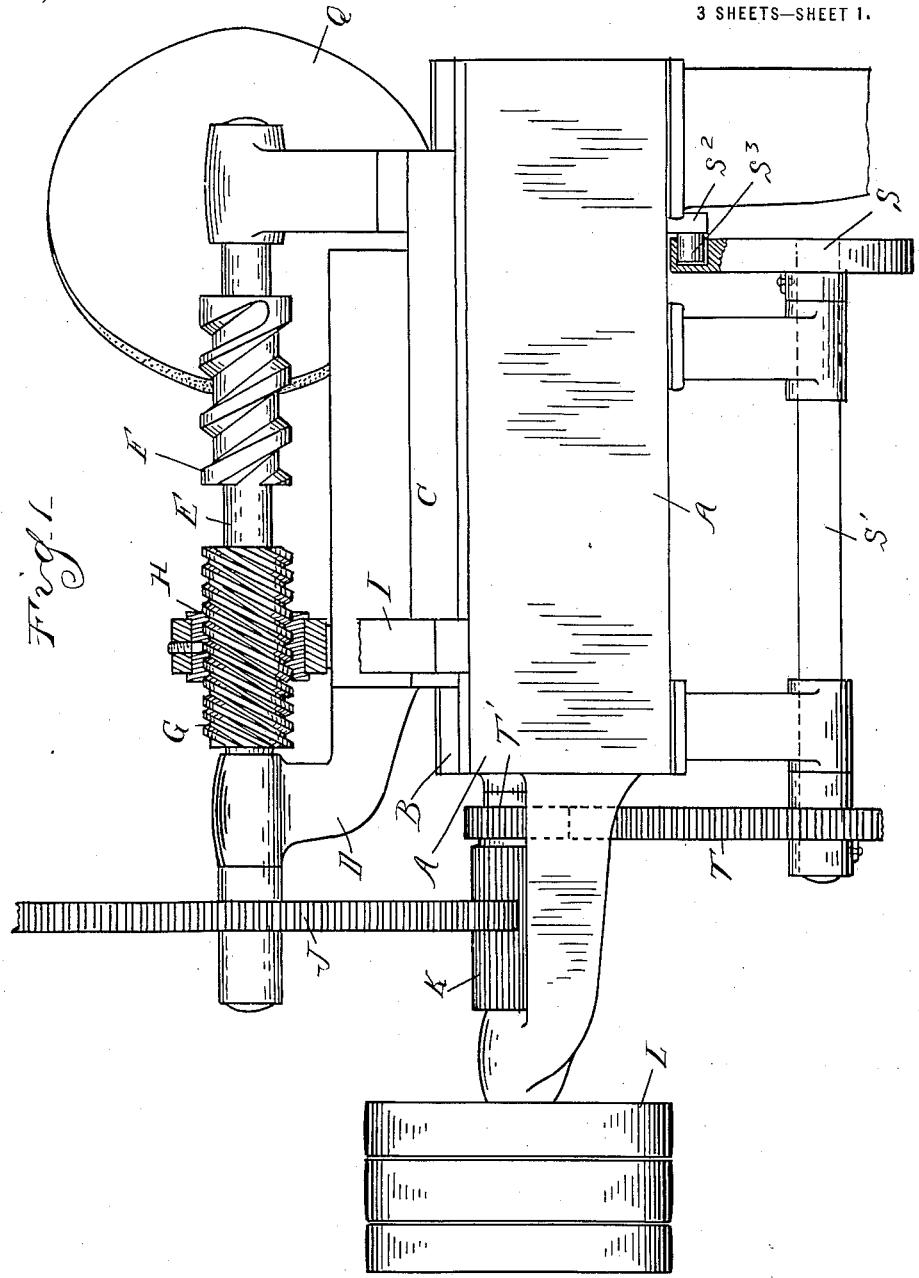
WITNESSES:
INVENTOR
William Emil Bock
BY
Whittemore Hulbert & Whittemore
ATTORNEYS

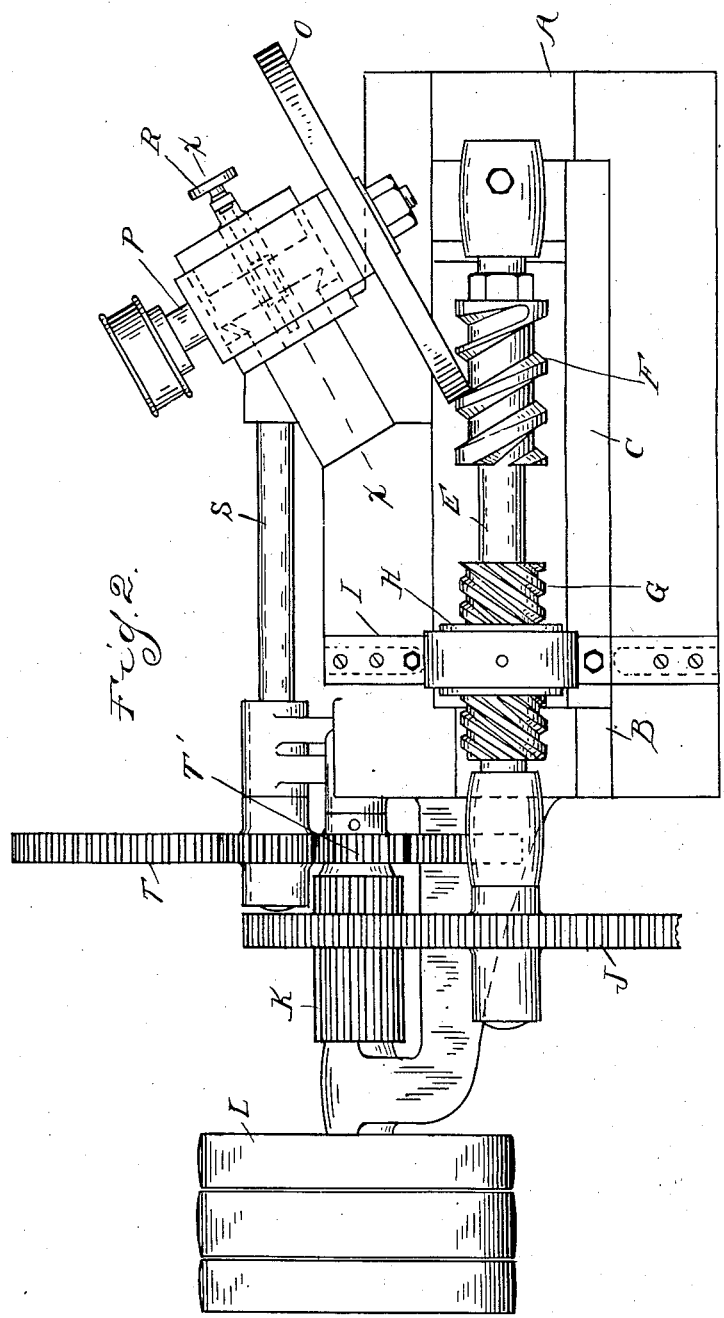

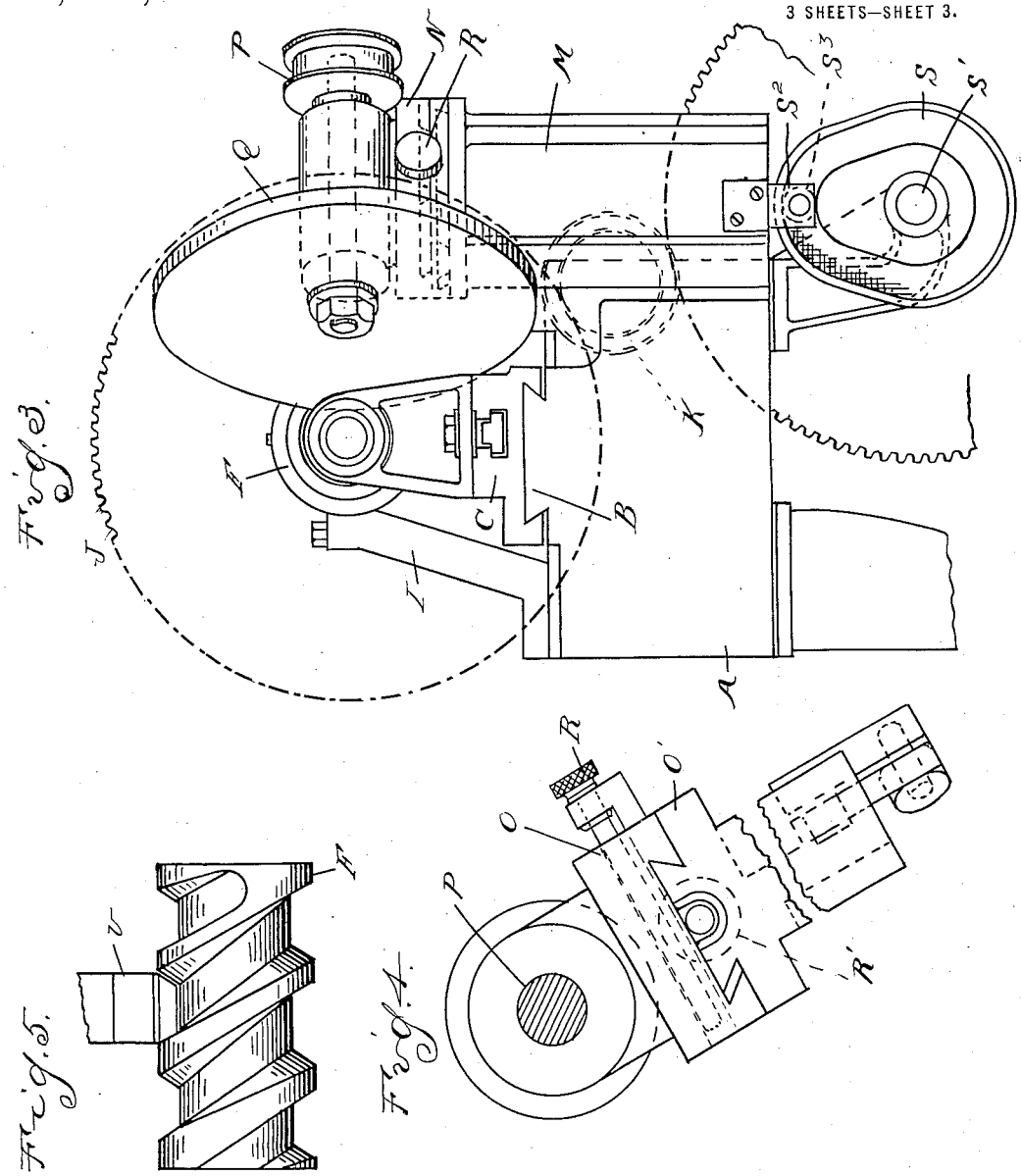

UNITED STATES PATENT OFFICE.

WILLIAM EMIL BOCK, OF TOLEDO, OHIO.

MACHINE FOR TRUING WORMS.

1,159,739.  Specification of Letters Patent.  Patented Nov. 9, 1915.

Application filed May 11, 1914. Serial No. 837,934.

*To all whom it may concern:*

Be it known that I, WILLIAM EMIL BOCK, a citizen of the United States of America, residing at Toledo, in the county of Lucas and State of Ohio, have invented certain new and useful Improvements in Machines for Truing Worms, of which the following is a specification, reference being had therein to the accompanying drawings.

The invention relates to machines for forming worms or worm-gearing, and has particular reference to a construction adapted for the truing of the worms after the heat treatment process.

In the drawings:—Figure 1 is a side elevation of the machine; Fig. 2 is a plan view thereof; Fig. 3 is an end elevation; Fig. 4 is a cross section on line $x$—$x$ Fig. 2; and Fig. 5 is an elevation illustrating a modified construction.

My improved construction is designed more particularly for the truing of worms or spiral gears of that type adapted for coöperation with roller pin gears, or gears in which the roller teeth project laterally therefrom to engage the worm. With worms of this type there is a variation in the angle of the spiral, due to the transverse movement of the roller teeth produced in a movement through a circular orbit. This renders the grinding and truing of the worm difficult if not impossible by any of the methods ordinarily employed. With my improved machine the worms are ground with perfect accuracy by combining with the relative longitudinal and rotary movement of the grinder and blank a transverse movement, which is controlled by a properly fashioned cam. This transverse movement changes the angle of contact between the grinder wheel and the work and produces a true contour for coöperation with the roller pin gear.

In detail, A is a suitable frame provided with longitudinally-extending ways B for a slidable carriage C.

D are bracket arms projecting upward from the carriage C, in which is journaled an arbor E for supporting the worm F which is to be ground. The arbor E is further provided with a worm or spiral gear G having a uniform pitch and which engages a threaded bearing H in a yoke or bracket I secured to the stationary part of the machine, the arrangement being such that the rotation of the arbor E will cause the worm G to feed said arbor together with its supporting bearing and the carriage C along the guides B.

J is a gear-wheel upon the arbor E which is in mesh with a pinion K of sufficient length to retain its engagement with the gear-wheel during the movement of the carriage.

L is a drive means for reciprocating the carriage, preferably consisting of tight and loose pulleys and reverse belts, such as commonly employed for this purpose.

Mounted upon the stationary part of the frame and at an angle to the axis of the arbor are vertical guides M, and N is a slidable head engaging said guides.

O and O' are transversely-arranged horizontal slides at the top of the slide N, and P is a grinding arbor journaled in bearings on the slide O and having the grinder wheel Q mounted thereon.

The arrangement is such that by suitable adjustment of the slides O and O' by means of adjusting screws R and R', the grinder wheel may be set in a predetermined relation to the work where the periphery of the wheel is in proper angular relation to the grind the spiral surface. At the same time the carriage which supports the blank arbor is fed forward through the operation of the worm G engaging the threaded bearing H. The pitch of this worm G is not, however, the same as that of the blank to be ground, inasmuch as the latter is designed to coöperate with a roller pin wheel, and further provision is therefore made for moving the grinder wheel transversely of the axis of the work. This comprises a cam S mounted upon a shaft S' and driven through the medium of intermeshing gear-wheels T and T' from the shaft of the pinion K. This cam is connected to operate the vertical slide N by the link S² and roller S³, and the cam is so fashioned that the grinder wheel Q will be raised and lowered during the movement of the carriage C in exact correspondence to the rising and falling of the roller pin in passing about its circular orbit. As a consequence the worm blank will be trued so as to perfectly intermesh with the coöperating pin-wheel.

In the complete operation of the machine, the carriage is reciprocated by shifting the belts upon the pulleys L, which alternately drives the gearing in reverse directions. This movement also reciprocates the vertical slide N through the medium of a cam S in the manner above described.

As shown in Fig. 5, in place of the grinder wheel arranged to grind with its peripheral surface, I may employ a conical grinder wheel U which is raised and lowered in the same manner as above described. This construction may be employed for grinding both faces of the spiral at the same time, while the construction first described grinds only a single face.

What I claim as my invention is:—

1. The combination with a rotary blank-holding arbor, of a grinder-wheel, means for relatively reciprocating said arbor and grinder-wheel longitudinally of the axis of the former, and coöperating means for producing a relative transverse movement during the longitudinal reciprocation.

2. The combination with a rotary blank-holding arbor and a grinder-wheel, of a carriage on which one of said elements is mounted, adapted for longitudinal reciprocation with respect to the other element, a worm mounted on the arbor engaging a threaded bearing on the mounting for the grinder, forming the means for relatively reciprocating the same, mechanism for rotating the arbor and worm, and a cam operated by said mechanism for raising and lowering the grinder-wheel in a direction transverse to said relative reciprocating movement.

3. The combination with a frame, of a carriage slidably mounted on said frame, a rotary blank-holding arbor journaled in bearings on said carriage, a worm mounted on said arbor, a threaded bearing engaging said worm having a fixed support upon said frame, a slide engaging vertical ways upon said frame, a grinder-wheel mounted on said slide and adjustable in relation to the blank, a cam for vertically moving said slide, and mechanism for operating said cam and rotating said arbor in timed relation.

4. The combination with a frame, of a carriage mounted for reciprocation on said frame, an arbor mounted on said carriage, extending longitudinally thereof and adapted to support the blank to be ground, a worm secured to said arbor, a threaded bearing engaging said worm and mounted in fixed position on said frame, gearing for rotating said arbor permitting of the reciprocation of said carriage, a slide engaging vertical ways on said frame, a grinder-wheel mounted on said slide and adjustable in relation to the blank, a cam for reciprocating said slide, and connecting mechanism between the mechanism for rotating said arbor and said cam for operating the latter in timed relation.

5. The combination with a frame, of a carriage slidably mounted on said frame, a rotary blank-holding arbor journaled in bearings on said carriage, vertical guides upon said frame at an angle to the axis of said arbor, a slidable head engaging said guides, transversely-arranged horizontal slides upon said head, a rotary member mounted upon said slides and adjustable in relation to the blank with its circumferential face adapted to act upon the blank, means for reciprocating said arbor and said rotary member longitudinally of the axis of the former relative to each other, and means for producing a relative transverse movement during the longitudinal reciprocation.

In testimony whereof I affix my signature in presence of two witnesses.

WILLIAM EMIL BOCK.

Witnesses:
ADELAIDE I. ADAMS,
JAMES P. BARRY.